(12) United States Patent
Johnson et al.

(10) Patent No.: US 9,441,540 B2
(45) Date of Patent: Sep. 13, 2016

(54) INDUCER GUIDE VANES

(71) Applicant: General Electric Company, Schenectady, NY (US)

(72) Inventors: Richard William Johnson, Greer, SC (US); David Martin Johnson, Simpsonville, SC (US); Bradley James Miller, Simpsonville, SC (US); Mitchell Merrill, Taylor, SC (US)

(73) Assignee: General Electric Company, Schenectady, NY (US)

( * ) Notice: Subject to any disclaimer, the term of this patent is extended or adjusted under 35 U.S.C. 154(b) by 969 days.

(21) Appl. No.: 13/669,046

(22) Filed: Nov. 5, 2012

(65) Prior Publication Data

US 2014/0140805 A1    May 22, 2014

(51) Int. Cl.
| | |
|---|---|
| *F02C 6/08* | (2006.01) |
| *F01D 25/14* | (2006.01) |
| *F04D 29/54* | (2006.01) |
| *F04D 29/70* | (2006.01) |

(52) U.S. Cl.
CPC .................. *F02C 6/08* (2013.01); *F01D 25/14* (2013.01); *F04D 29/545* (2013.01); *F04D 29/701* (2013.01)

(58) Field of Classification Search
CPC .......... F02C 6/08; F04D 29/545; F01D 9/06; F01D 25/14; F01D 5/08; F01D 5/081; F01D 5/082; F01D 5/083; F01D 5/084

USPC ....................... 415/208.1, 115, 116
See application file for complete search history.

(56) References Cited

U.S. PATENT DOCUMENTS

| | | | | |
|---|---|---|---|---|
| 2,988,325 A * | 6/1961 | Dawson | .................. | F01D 5/081 415/110 |
| 3,602,605 A * | 8/1971 | Lee | ........................ | F01D 5/08 415/116 |
| 3,832,090 A * | 8/1974 | Matto | ..................... | F01D 5/081 415/115 |
| 4,236,869 A * | 12/1980 | Laurello | ................. | F01D 5/081 415/115 |
| 4,302,148 A * | 11/1981 | Tubbs | ...................... | F02C 7/18 415/115 |
| 7,874,799 B2 * | 1/2011 | Young | ..................... | F01D 5/082 415/115 |

FOREIGN PATENT DOCUMENTS

GB          1062170 A  *  3/1967  ............. F01D 5/081

* cited by examiner

*Primary Examiner* — Ninh H. Nguyen
*Assistant Examiner* — Jesse Prager
(74) *Attorney, Agent, or Firm* — Sutherland Asbill & Brennan LLP

(57) ABSTRACT

According to one embodiment, there is disclosed an inducer assembly for use with a gas turbine engine. The inducer assembly may include a cavity. The inducer assembly may also include an inducer in fluid communication with the cavity. Moreover, the inducer assembly may include at least one guide vane disposed within the cavity.

8 Claims, 4 Drawing Sheets

INDUCER GUIDE VANES

FIELD OF THE DISCLOSURE

Embodiments of the present disclosure relate generally to gas turbine engines and more particularly to inducer assemblies including one or more guide vanes.

BACKGROUND OF THE DISCLOSURE

Gas turbine engines are widely utilized in fields such as power generation. A conventional gas turbine engine may include a compressor, a combustor, and a turbine. The compressor may supply compressed air to the combustor, where the compressed air may be mixed with fuel and burned to generate a hot gas. This hot gas may be supplied to the turbine, where energy may be extracted from the hot gas to produce work. During operation of the gas turbine engine, the components and areas that are subjected to high temperature flows may be cooled to allow the gas turbine engine to operate with flows at increased temperatures. Examples of areas that may be cooled include the turbine buckets.

BRIEF DESCRIPTION OF THE DISCLOSURE

Some or all of the above needs and/or problems may be addressed by certain embodiments of the present disclosure. According to one embodiment, there is disclosed an inducer assembly for use with a gas turbine engine. The inducer assembly may include a cavity. The inducer assembly may also include an inducer in fluid communication with the cavity. Moreover, the inducer assembly may include at least one guide vane disposed within the cavity.

According to another embodiment, there is disclosed a method for use with a gas turbine engine. The method may include flowing a cavity fluid flow within a cavity in a gas turbine assembly. The method may also include flowing a inducer fluid flow within an inducer that is in fluid communication with the cavity. Moreover, the method may include positioning at least one guide vane in the region where the cavity fluid flow and the inducer fluid flow merge. The at least one guide vane may be configured to reduce a pressure loss in the region where the cavity fluid flow and the inducer fluid flow merge.

Further, according to another embodiment, there is disclosed a gas turbine engine system. The system may include a compressor assembly, a combustor assembly in communication with the compressor assembly, and a turbine assembly in communication with the compressor assembly and the combustor assembly. The system may also include a cavity disposed within the turbine assembly. In addition, the system may include an inducer in fluid communication with the cavity and the compressor assembly. Moreover, the system may include at least one guide vane disposed within the cavity.

Other embodiments, aspects, and features of the invention will become apparent to those skilled in the art from the following detailed description, the accompanying drawings, and the appended claims.

BRIEF DESCRIPTION OF THE DRAWINGS

Reference will now be made to the accompanying drawings, which are not necessarily drawn to scale, and wherein.

DETAILED DESCRIPTION OF THE DISCLOSURE

Illustrative embodiments will now be described more fully hereinafter with reference to the accompanying drawings, in which some, but not all embodiments are shown. The present disclosure may be embodied in many different forms and should not be construed as limited to the embodiments set forth herein. Like numbers refer to like elements throughout.

Illustrative embodiments are directed to, among other things, a gas turbine engine systems including one or more inducer assemblies each having one or more guide vanes. For example, in one embodiment, an inducer assembly may include a cavity, an inducer in fluid communication with the cavity, and at least one guide vane disposed within the cavity. In some instances, the guide vane may be disposed within the cavity adjacent to the inducer. In other instances, the guide vane may be disposed within the cavity upstream of the inducer. In still other instances, the guide vane may be disposed within the cavity in a region where a cavity fluid flow and an inducer fluid flow merge. In such instances, the guide vane may be configured to reduce a pressure loss in the region where the cavity fluid flow and the inducer fluid flow merge.

In certain embodiments, the guide vane may include a number of guide vanes. For example, the guide vanes may include a number of arcuate shaped protrusions extending into the cavity. In another example, the guide vane may include a triangular shaped protrusions extending into the cavity. One will appreciated, however, that any number of guide vanes may be used, and that the guide vanes may be any shape and/or configuration to reduce a pressure loss in the region where the cavity fluid flow and the inducer fluid flow merge.

Figure 1:
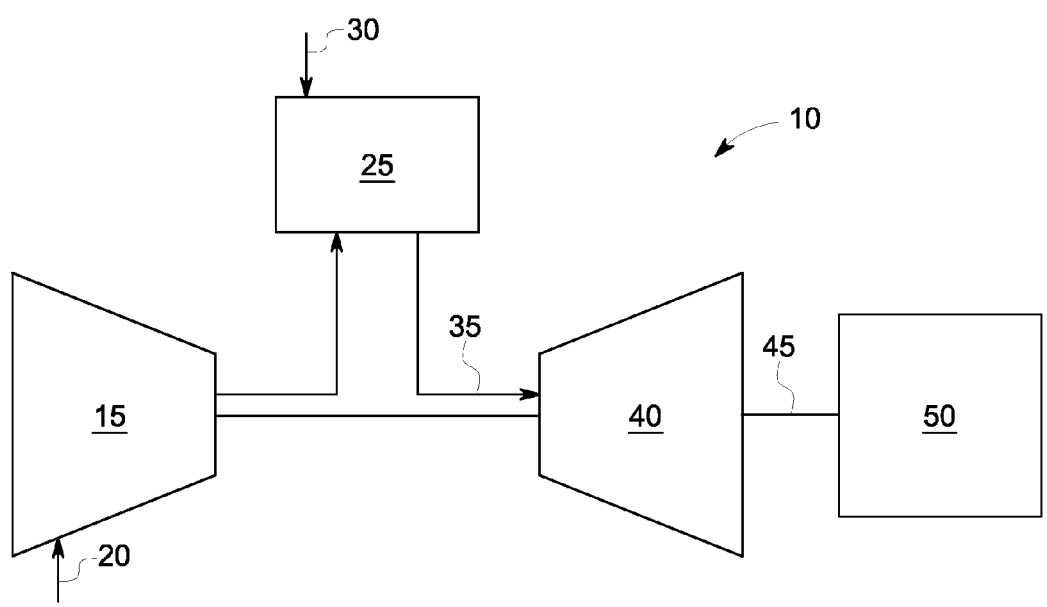
FIG. 1 is a schematic of an example diagram of a gas turbine engine with a compressor, a combustor, and a turbine, according to an embodiment of the disclosure.

Turning now to FIG. 1, which depicts a schematic view of an example embodiment of a gas turbine engine 10 as may be used herein. For example, the gas turbine engine 10 may include a compressor 15. The compressor 15 may compress an incoming flow of air 20. The compressor 15 may deliver the compressed flow of air 20 to a combustor 25. The combustor 25 may mix the compressed flow of air 20 with a pressurized flow of fuel 30 and ignite the mixture to create a flow of combustion gases 35. Although only a single combustor 25 is shown, the gas turbine engine 10 may include any number of combustors 25. The flow of combustion gases 35 in turn may be delivered to a turbine 40. The flow of combustion gases 35 may drive the turbine 40 so as to produce mechanical work. The mechanical work produced in the turbine 40 may drive the compressor 15 via a shaft 45 and an external load 50 such as an electrical generator or the like.

The gas turbine engine 10 may use natural gas, various types of syngas, and/or other types of fuels. The gas turbine engine 10 may be any one of a number of different gas turbine engines offered by General Electric Company of Schenectady, N.Y., including, but not limited to, those such as a 7 or a 9 series heavy duty gas turbine engine or the like. The gas turbine engine 10 may have different configurations and may use other types of components. Moreover, other types of gas turbine engines also may be used herein. Multiple gas turbine engines, other types of turbines, and other types of power generation equipment also may be used herein together.

Figure 2:
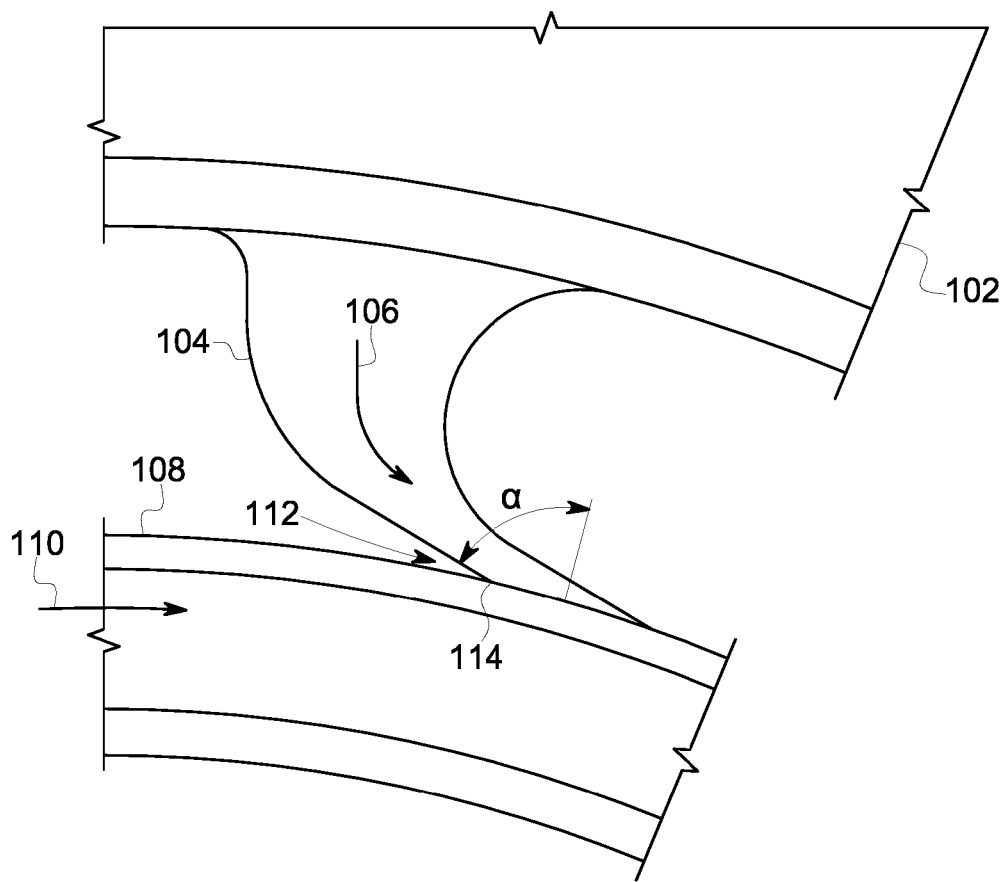
FIG. 2 is a side view of a portion of an inducer assembly, according to an embodiment of the disclosure.

Referring to FIG. 2, there is depicted a partial view of an example embodiment of the gas turbine engine 10. In one embodiment, the gas turbine engine 10 may include a compressor discharge casing 102. The compressor discharge casing 102 may include a flow of compressor discharge air 106 therein. For example, the compressor discharge air 106 may be a diverted flow of compressed air from the compressor 15. Other air supplies and/or fluids may also be used.

In some instances, an inducer 104 may be in fluid communication with the compressor discharge casing 102. For example, the inducer 104 may be configured to divert at least a portion of the compressor discharge air 106 into the inducer 104. Opposite the compressor discharge casing 102, the inducer 104 may be in fluid communication with a cavity 108, such as a swirl cavity. That is, the compressor discharge casing 102 and the cavity 108 may be in fluid communication with each other via the inducer 104. The cavity 108 may include an airflow 110 or other fluid flow therein. In this manner, the compressor discharge air 106 exiting the inducer 104 may be combined with the airflow 110 in the cavity 108. In some instances, the combined airflow 106 and 110 may be, for example, directed to a cooling circuit in communication with one or more turbine buckets, such as a stage one turbine bucket, or elsewhere.

In certain example embodiments, the inducer 104 may be configured to accelerate and direct at least a portion of the compressor discharge air 106 tangentially towards the cavity 108. For example, cooling air (such as compressor discharge air 106 diverted from the compressor 15) may be channeled to the inducer 104. The inducer 104, in turn, may accelerate and direct some of the compressor discharge air 106 tangentially toward/into the cavity 108. In this manner, the configuration of the inducer 104 may drive airflow 110 within the cavity 108 in a swirling manner. In some examples, the inducer 104 may comprise a circumferentially disposed array of ducts that control the tangential speed and direction of the airflow 106.

As previously noted, in one example embodiment, the inducer 104 may generate swirl in the cavity 108, which lowers the relative temperature of the airflow 110 therein. For example, the flow of compressor discharge air 106 may exit the inducer 104 into the cavity 108, where it is then directed to a circuit that leads to, for example, a stage one turbine bucket.

It should be noted that inducers 104 with high exit flow angles α into the cavity 108 are desired because they result in the greatest amount of generated swirl within the cavity 108. If the flow angle α of the inducer 104 is too large, however, a thin material section 112 may form at the junction between the cavity 108 and the trailing-edge 114 of the inducer 104. In some instances, due to the nature of the thin material section 112, it can be subject to failure from high thermal stresses or fatigue. To avoid the thin material section 112, lower flow angles α are typically used. Lower flow angles α, however, may compromise inducer 104 performance. For example, a low flow angle α may cause the inducer airflow 106 and swirling cavity airflow 110 of the cavity 108 to collide abruptly, resulting in high mixing pressure losses.

Figure 3:
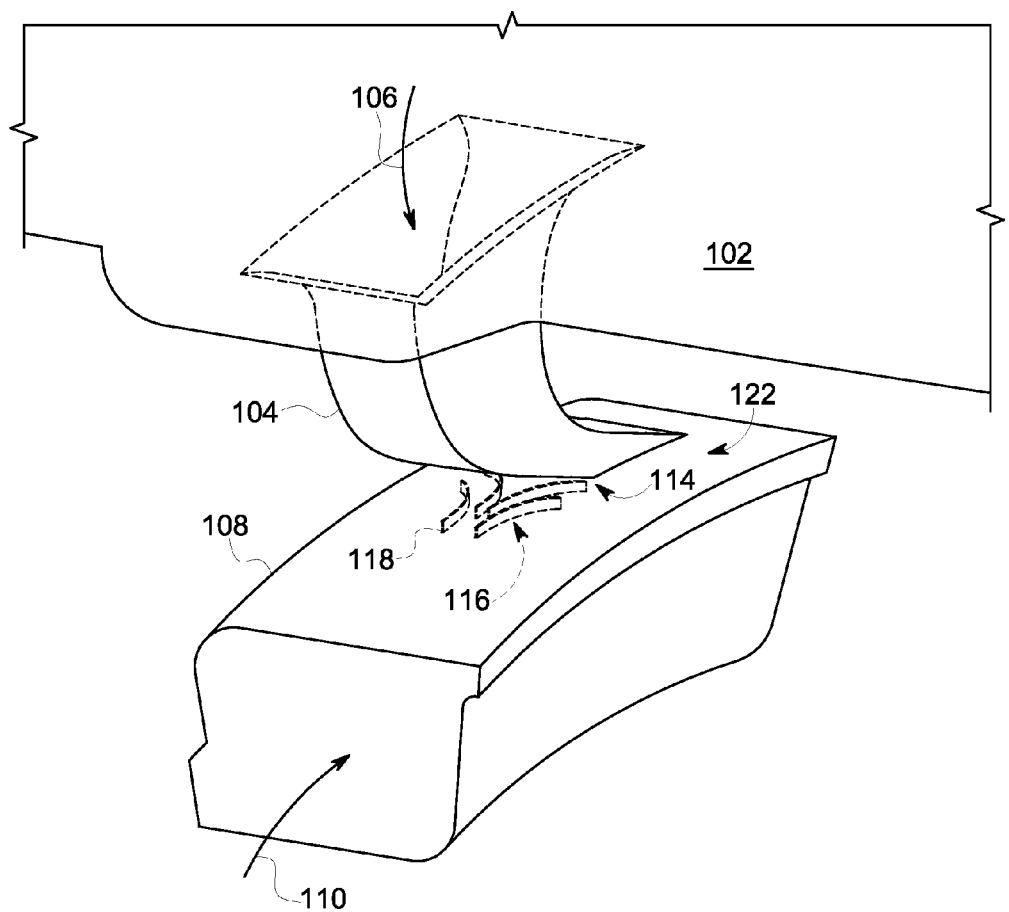
FIG. 3 is a perspective view of a portion of an inducer assembly, according to an embodiment of the disclosure.

As depicted in FIG. 3, in some instances, one or more guide vanes 116 may be disposed within the cavity 108 adjacent to the inducer 104. The guide vanes 116 may be configured to divert some of the swirling cavity airflow 110 away from the exit region of the inducer 104. In this manner, the guide vanes 116 may enable the inducer airflow 106 and cavity airflow 110 to merge less abruptly and with lower pressure losses. In one example, the guide vanes 116 may be disposed within the cavity 108 upstream of the inducer 104. In other examples, the guide vanes 116 may be disposed within the cavity 108 in a region 122 where the cavity airflow 110 and the inducer airflow 106 merge. That is, the guide vanes 116 may be configured to reduce a pressure loss in the region 122 where the cavity airflow 110 and the inducer airflow 106 merge.

Figure 4:
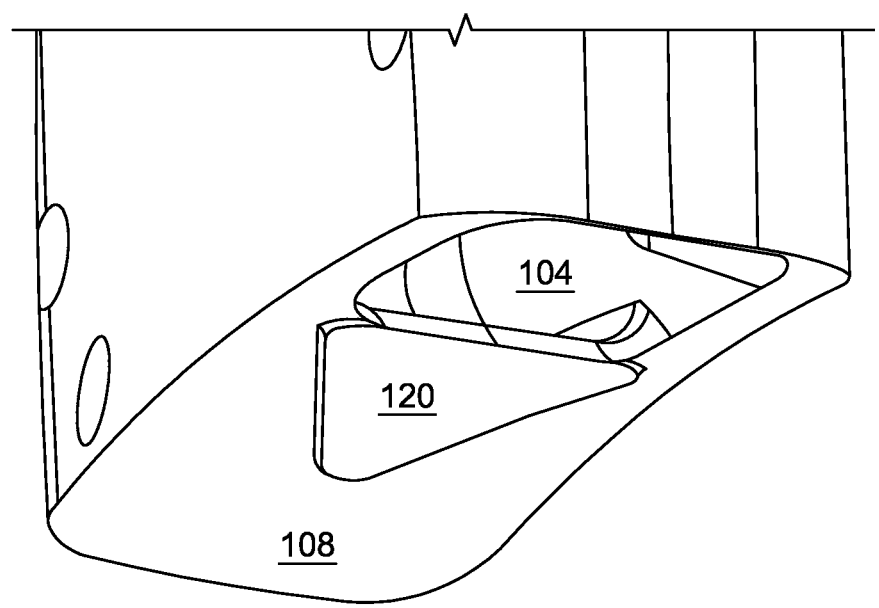
FIG. 4 is a perspective view of a portion of an inducer assembly, according to an embodiment of the disclosure.

In certain embodiments, as depicted if FIG. 3, the guide vanes 116 may include a number of arcuate shaped protrusions 118 extending into the cavity 108. For example, the arcuate shaped protrusions 118 may include one or more elongated fins spaced apart from one another and positioned adjacent to the upstream end (e.g., the trailing-edge 114) of the inducer 104. In another example embodiment, as depicted in FIG. 4, the guide vanes 116 may include a triangular shaped protrusion 120 extending into the cavity 108. Any number of guide vanes may be used. Moreover, the guide vanes may be any shape and/or configuration.

Certain illustrative embodiments described herein may increase the efficiency of the inducer 104. Higher efficiencies may translate into more cavity swirl, resulting in lower relative temperatures for a given pressure drop across the inducer 104. Lower temperatures in turn reduce bucket flow requirements and/or provide improved bucket life. For example, the lower pressure drop between the inducer airflow 106 and swirling cavity airflow 110 may facilitated greater cooling of the swirling cavity airflow 110, which may be directed to one or more turbine buckets for cooling the turbine buckets.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. An inducer assembly for use with a gas turbine engine having one or more turbine blades, comprising:
    a discharge casing;
    a swirl cavity;
    an inducer disposed between and in fluid communication with the discharge casing and the swirl cavity, wherein the inducer comprises an inlet at the discharge casing and an outlet at the swirl cavity, wherein the outlet comprises a tangential exit angle into the swirl cavity, wherein the inducer tangentially accelerates and directs a flow of discharge air from the discharge casing tangentially into the swirl cavity to drive the discharge air within the swirl cavity in a swirling manner; and
    at least one guide vane disposed on a wall within the swirl cavity adjacent to and upstream of the inducer outlet to reduce a pressure loss due to the tangential exit angle in a region where an airflow from the inducer merges with the swirling airflow within the swirl cavity.

2. The inducer assembly of claim 1, wherein the at least one guide vane comprises a plurality of guide vanes.

3. The inducer assembly of claim 1, wherein the at least one guide vane comprises a plurality of arcuate shaped protrusions extending into the cavity.

4. The inducer assembly of claim 1, wherein the at least one guide vane comprises a triangular shaped protrusions extending into the cavity.

5. A gas turbine system, comprising:
   a compressor assembly;
   a combustor assembly in communication with the compressor assembly;
   a turbine assembly in communication with the compressor assembly and the combustor assembly;
   a discharge casing;
   a swirl cavity;
   an inducer disposed between and in fluid communication with the discharge casing and the swirl cavity, wherein the inducer comprises an inlet at the discharge casing and an outlet at the swirl cavity, wherein the outlet comprises a tangential exit angle into the swirl cavity, wherein the induces tangentially accelerates and directs a flow of discharge air from the discharge casing tangentially into the swirl cavity to drive the discharge air within the swirl cavity in a swirling manner; and
   at least one guide vane disposed on a wall within the swirl cavity adjacent to and upstream of the inducer outlet to reduce a pressure loss due to the tangential exit angle in a region where an airflow from the inducer merges with the swirling airflow within the swirl cavity.

6. The system of claim 5, wherein the at least one guide vane comprises a plurality of guide vanes.

7. The system of claim 5, wherein the at least one guide vane comprises a plurality of arcuate shaped protrusions extending into the cavity.

8. The system of claim 5, wherein the at least one guide vane comprises a triangular shaped protrusions extending into the cavity.

* * * * *